Figure 2:
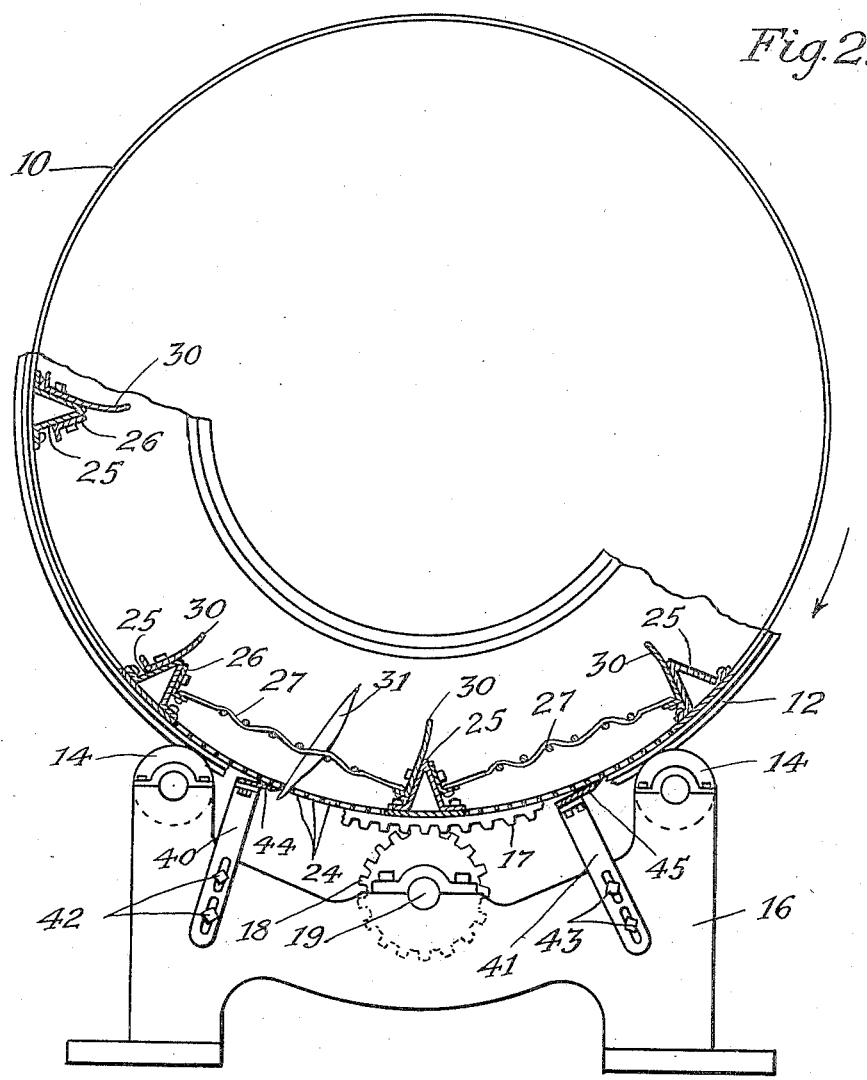

E. J. VAUDREUIL.
APPARATUS FOR SNIPPING BEANS.
APPLICATION FILED MAR. 12, 1917. RENEWED JAN. 15, 1920.
1,351,143.
Patented Aug. 31, 1920.
2 SHEETS—SHEET 1.
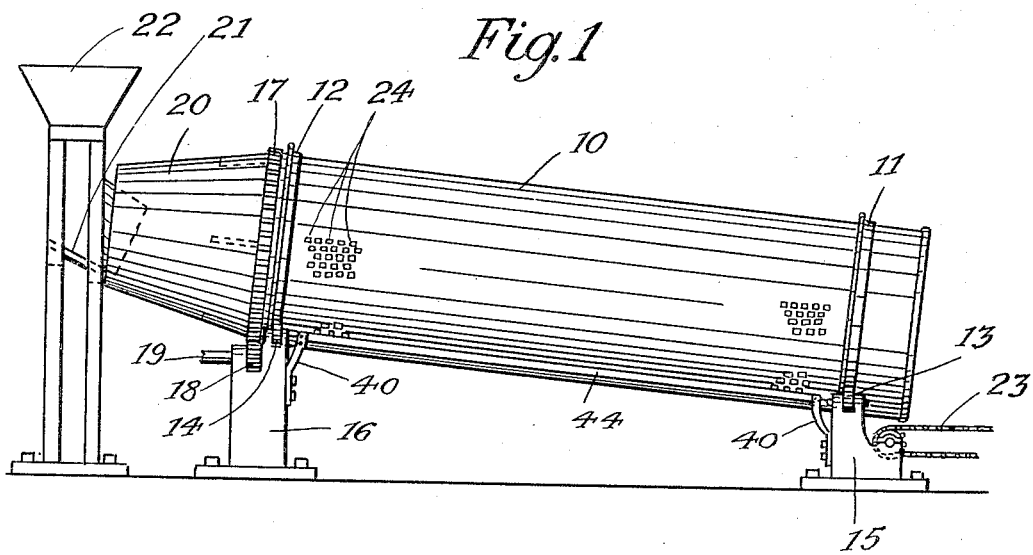
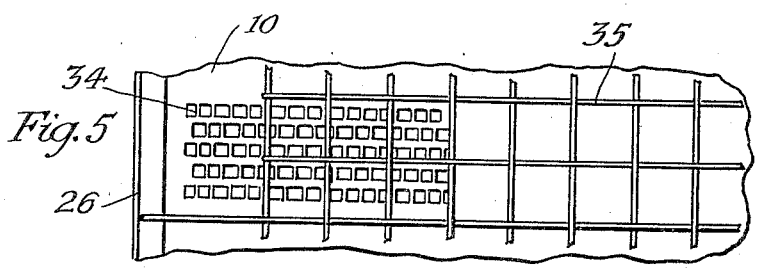
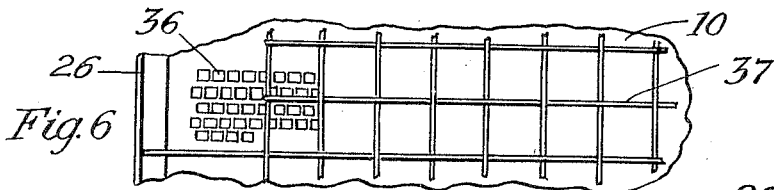
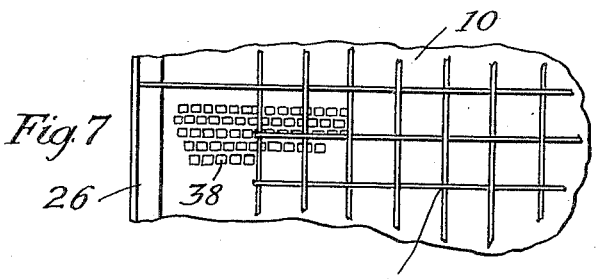
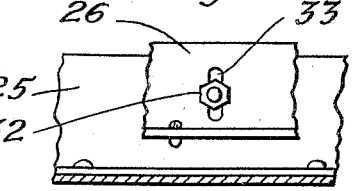
Inventor:
Edward J. Vaudreuil
By F. A. Whiteley
his Attorney E. J. VAUDREUIL.
APPARATUS FOR SNIPPING BEANS.
APPLICATION FILED MAR. 12, 1917., RENEWED JAN. 15, 1920.

1,351,143.

Patented Aug. 31, 1920.
2 SHEETS—SHEET 2.

Inventor:
Edward J. Vaudreuil
By *[signature]*
his Attorney.

UNITED STATES PATENT OFFICE.

EDWARD J. VAUDREUIL, OF EAU CLAIRE, WISCONSIN.

APPARATUS FOR SNIPPING BEANS.

1,351,143. Specification of Letters Patent. Patented Aug. 31, 1920.

Application filed March 12, 1917, Serial No. 154,104. Renewed January 15, 1920. Serial No. 351,556.

*To all whom it may concern:*

Be it known that I, EDWARD J. VAUDREUIL, a citizen of the United States, residing at Eau Claire, in the county of Eau Claire and State of Wisconsin, have invented certain new and useful Improvements in Apparatus for Snipping Beans, of which the following is a specification.

My invention relates to apparatus for snipping the ends of bean pods, and has for its object to prepare such pods for canning or other culinary purposes by clipping or snipping off the ends of the pods which otherwise would interfere with the canning. It is a particular object of my invention to provide an apparatus such that pods may continuously be fed to the apparatus and the ends of all of such pods will be snipped or clipped during their passage through the apparatus, and snipped pods will be delivered from the delivery end of the machine.

The apparatus herein shown embodies continuously rotating cylinders into which the pods are fed at one end and through which they travel by gravity to the discharge end by reason of inclination of the cylinder or other means. Said cylinder is provided with a multiplicity of apertures through the walls thereof of a size to receive the ends of the pods and permit the part to be snipped to protrude through said apertures, but not large enough to allow the pod to pass through. In addition to this coarse mesh nets or webs are provided which engage the bean pods as the bean pods fall from the upper portions of the rotary cylinder, and tend to cause said bean pods to take vertical positions above the walls of the cylinder so that the ends of the pods will enter apertures and protrude through the cylinder wall. One or more bars or knives are provided on the outside of the cylinder adjacent to the periphery which catch and snip the ends of bean pods protruding through the apertures.

The full objects and advantages of my invention will appear in connection with the detailed description thereof, and are particularly pointed out in the claims.

In the drawings illustrating the application of my invention, in one form,—

Figure 3:
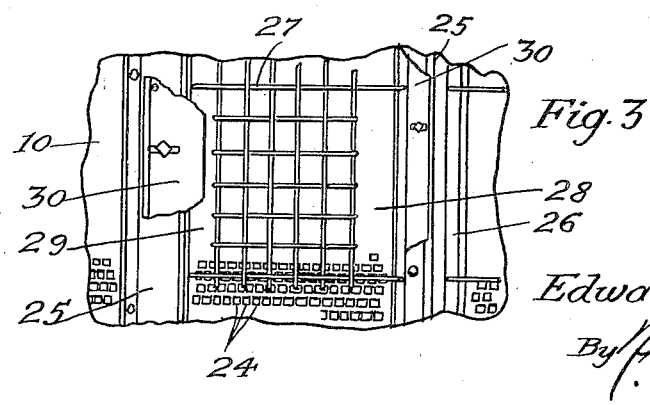

Figure 1 is a side elevation of an apparatus embodying my process. Fig. 2 is an enlarged end elevation of the same with some parts broken away. Fig. 3 is a plan view of a portion of the interior of the cylinder showing the pod-positioning net or web. Fig. 4 illustrates the manner of adjustably holding the pod-positioning nets in the cylinder. Figs. 5, 6, and 7 are fragmentary plan views on an enlarged scale of portions of cylinders and positioning nets therein of different sizes for operation upon different assortments of bean pods.

The bean pods as they come from the field are first sorted by any desired means into lots of substantially uniform size. In general, there will be from three to five of such sizes, which are ordinarily packed separate and are sold at different prices, the smaller beans bringing the higher price. In practice, I have found that ordinarily not more than three different cylinders, as shown and described herein, having different sizes of apertures and different positioning nets within the same, are required to care for the various assortments of bean pods which come to the cannery from the field.

A cylinder or drum 10 is supported by angle iron bands 11 and 12 upon front and rear rollers 13 and 14 journaled in supporting stands 15 and 16. A ring gear 17 meshes with a drive pinion 18 on a driven shaft 19 journaled in supporting standard 16 by which the cylinder 10 is rotated at the desired speed. A funnel member 20 is connected by a chute 21 with a hopper 22 by means of which the bean pods are fed at the desired rate, first into the hopper 20 and thence into the body of the cylinder 10. As shown in Fig. 1 the cylinder is set at a suitable angle so that as the bean pods are rotated around and around with the cylinder they will travel toward the front or discharge end thereof, finally discharging upon the conveyer belt 23.

The cylinder 10 is preferably made of sheet metal and has formed therein a multiplicity of apertures 24, there being as many of such apertures as can be formed of the desired size and leave the shell of the cylinder sufficiently strong to stand up and perform its shearing function. To add to the strength of the cylinder and for the purpose of receiving the positioning nets or webs, hereinafter described, a multiplicity of ribs 25 preferably of inverted V-shape, as shown in Fig. 2, are secured longitudinally to the inside walls of cylinder 10. The facing walls of said ribs are parallel and secured to these walls are frames 26 which carry a wire mesh 27, as shown in detail in Fig. 3, and which are thereby held spaced from the inner wall of the cylinder, as indicated in Fig. 2. It is to be noted that the wire mesh 27 provides rectangular openings of much larger size than the openings 24 through the cylinder. Even with the smallest size mesh the space of one of the openings therein will overlie ten or more of the apertures in the wall, as clearly appears from an inspection of Figs. 5, 6 and 7. It is also true that apertures in the wall which are not directly beneath an aperture of the mesh may receive the end of a bean pod which is caused to pass angularly or endwise toward the drum wall and its apertures by the wires of the mesh. It is also true that the rectangular openings in the wire mesh are less than the length of any bean pod, preferably being substantially half of the length of a pod, and are spaced from the walls of the drum a distance which is substantially equal to the dimensions of the openings in the mesh. It follows that a bean pod in falling upon the mesh cannot go bodily through but must strike some of the wires of the mesh and thereby be tipped or tilted so that it will actually go to the wall of the cylinder angularly disposed with respect to the cylinder, or endwise. This, with the large number of apertures available for a pod end to get into is what insures all of the pod ends ultimately getting into an aperture. Also that spaces 28 and 29 on each side of the mesh 27 and between it and the walls of ribs 25 are left open to permit bean pods which may get outside of the mesh to be freely discharged from the walls of the ribs as the same is moved upwardly. It is to be noted also that the frames 26 preferably have one edge thereof, as indicated at 30, curved in the direction of rotation of the cylinder so as to hold the bean pods from discharge until the same have been carried to or past the top of the cylinder, from which point they will tend to drop longitudinally and will strike the meshes 27, and in going through the same will be positioned as indicated at 31 so that the ends thereof will pass into the apertures 24. The frames 26 are adjustably connected to the ribs 25 by bolts 32 passing through slots 33 in said frames and into the ribs.

The apertures in the shell of the cylinder 10 are preferably formed square. As indicated in Fig. 5, the cylinder 10 has apertures 34 of largest size coöperating with a mesh 35 of corresponding larger size; while in Fig. 6 the apertures in cylinder 10 indicated at 36 are smaller in size than those at 34 and coöperate with a mesh 37 of smaller size than mesh 35; and the apertures 38 in cylinder 10 shown in Fig. 7 coöperate with a mesh 39 of still smaller size. These cylinders having the several sizes of apertures and of mesh are sufficient to take care of the various assortments of bean pods resulting from any given picking.

Arms 40 and 41 are adjustably secured by bolt and slot connection 42 and 43 with the supports 15 and 16 and the respective pairs of said arms carry shearing bars or knives 44 and 45 positioned in proximity to the outer periphery of the rotating cylinder 10, where said knives will engage the protruding ends of bean pods and snip them off. I have shown two such knives, but do not desire to limit myself, as a greater or less number may be employed.

The apparatus herein described is one which will efficiently carry out the steps of my process claimed in a co-pending application filed as a division hereof, Serial No. 171,405, in which the cylinder provides a perforated supporting member, the rotation of the cylinder provides means for agitating and turning the pods which through engagement with the wire mesh are thus caused to be presented to the perforations in the support, and the relative movement of the pods held by the apertures in the cylinder and the knife bars provides means for snipping the ends of the pods.

The advantages of this invention will be apparent. The pods after having been sorted can be continuously fed through the cylinder 10 at a very rapid rate. As shown in Fig. 1, the cylinder or drum 10 is set at an angle. The pods are fed in at the highest point of this angularly disposed drum from hopper 22, chute 21 and funnel feeder 20. The travel of the pods through the machine is thus caused by the fact that as they are lifted and dropped they continually go to a lower point along the slope of the machine until they reach the other upper end of the drum and are there discharged. Each pod will be agitated and turned and dropped endwise many times in the course of its travel from its entrance into the cylinder to its discharge upon the conveyer belt 23. This will result in giving each end of every pod many opportunities to enter a perforation with the result that few, if any, of the pods will reach the conveyer 23 without having part of the ends properly snipped. It will be noted that the square apertures 34, 36 and 38 are each of a size to permit an end of a pod to pass sufficiently far through the aperture to present the right part of said end to the snipping action of the bars or knives, but of a size to hold the pods of any assortment from going farther than that. From the fact that the pods of any picking will vary in size arises the necessity of assorting the pods into lots of relatively similar size and providing several agitating, turning, and snipping means having inner and outer sets of apertures of a proper size to operate upon the particular assortment of pods.

I claim:

1. A machine for snipping bean pods comprising a pair of spaced and apertured members, the apertures of the outer member being of a size to receive the end of a pod and to permit only the portion to be snipped to extend outside of the member, and means coöperating with said outer member to snip such protruding ends.

2. A machine for snipping bean pods comprising a pair of spaced and apertured members, the apertures of the outer member being of a size to receive the end of a pod and to permit only the portion to be snipped to extend outside of the member, and the apertures of the inner member having their greatest dimension less than the length of the pods, said inner member apertures overlying many apertures of the outer member, and means coöperating with the outer member to snip the protruding ends.

3. A machine for snipping bean pods comprising a cylinder having a multiplicity of apertures through the walls thereof of a size to receive the ends of the pods and to permit the portion to be snipped to extend outside of said cylinder, longitudinal ribs in the cylinder for lifting the pods as the cylinder is rotated to let them fall so that the ends thereof will be presented to the apertures, a series of frames supported by the ribs and having meshes carried thereby in spaced relation to the inner wall of the cylinder to turn the pods endwise to the wall of the cylinder, and means coöperating with the outer periphery of the cylinder to snip and remove pod ends extending through said apertures.

4. A machine for snipping bean pods comprising a cylinder having a multiplicity of apertures through the walls thereof of a size to receive the ends of the pods and to permit the portion to be snipped to extend outside of said cylinder, longitudinal ribs in the cylinder for lifting the pods as the cylinder is rotated to let them fall so that the ends thereof will be presented to the apertures, frames carried by said ribs and adjustably connected therewith to be positioned nearer to or farther from the inside of the cylinder as may be desired, said frames carrying a mesh or wire netting to engage and turn the falling pods so that they will be presented endwise against the wall of the cylinder, and means coöperating with the outer periphery of the cylinder to snip and remove pod ends extending through said apertures.

5. A machine for snipping bean pods comprising a cylinder having a multiplicity of apertures through the walls thereof of a size to receive the ends of the pods and to permit the portion to be snipped to extend outside of said cylinder, means for rotating the cylinder to cause the pods to be agitated and dropped, and a series of screens having relatively large meshes spaced from the wall of the cylinder for engaging and turning the pods as they fall to cause the ends to extend into the apertures, and means coöperating with said rotating cylinder to snip and remove the ends of pods protruding through said apertures.

6. A machine for snipping bean pods comprising a cylinder having a multiplicity of apertures through the walls thereof of a size to receive the ends of the pods and to permit the portion to be snipped to extend outside of said cylinder, longitudinal ribs in the cylinder for lifting the pods as the cylinder is rotated to let them fall so that the ends thereof will be presented to the apertures, wire screens of large mesh supported by said ribs so that the mesh is spaced from the inner wall of the cylinder, said screens having elongated openings adjacent the ribs to permit pods from beneath the screens to be carried by and readily discharged from the ribs, and means coöperating with the outer periphery of the cylinder to snip and remove pod ends extending through said apertures.

7. A machine for snipping bean pods comprising a drum having a multiplicity of apertures through the walls thereof, each of a size to receive an end of a pod and to permit the portion to be snipped to protrude outside of said drum, means for rotating the drum, means within the drum for lifting the pods as the drum is rotated to cause them to fall from the upper part of the drum, a second apertured member within the drum to engage and turn the pods endwise to the wall of the drum, and means coöperating with the outer periphery of the drum to snip and remove pod ends extending through said apertures.

8. A machine for snipping bean pods comprising an apertured drum, lifter blades within the drum, apertured members within and spaced from the walls of the drum, means to rotate the drum, and a knife coöperating with the outer wall of the drum to snip protruding pod ends.

In testimony whereof I affix my signature.

EDWARD J. VAUDREUIL.